US011321935B2

(12) United States Patent
Han et al.

(10) Patent No.: US 11,321,935 B2
(45) Date of Patent: May 3, 2022

(54) THREE-DIMENSIONAL (3D) MODELING METHOD OF CLOTHING

(71) Applicant: Z-EMOTION CO., LTD., Busan (KR)

(72) Inventors: Dong Soo Han, Busan (KR); Dong Wook Yi, Busan (KR)

(73) Assignee: Z-EMOTION CO., LTD., Haeundae-gu Busan (KR)

( * ) Notice: Subject to any disclaimer, the term of this patent is extended or adjusted under 35 U.S.C. 154(b) by 0 days.

(21) Appl. No.: 17/050,037

(22) PCT Filed: Nov. 28, 2019

(86) PCT No.: PCT/KR2019/016643
§ 371 (c)(1),
(2) Date: Oct. 23, 2020

(87) PCT Pub. No.: WO2021/107202
PCT Pub. Date: Jun. 3, 2021

(65) Prior Publication Data

US 2021/0166492 A1 Jun. 3, 2021

(30) Foreign Application Priority Data

Nov. 28, 2019 (KR) ........................ 10-2019-0155797

(51) Int. Cl.
*G06T 19/20* (2011.01)
*G06K 9/62* (2022.01)
(Continued)

(52) U.S. Cl.
CPC ............ *G06T 19/20* (2013.01); *G06K 9/6289* (2013.01); *G06T 5/50* (2013.01); *G06T 15/04* (2013.01); *G06T 15/506* (2013.01); *G06T 17/20* (2013.01)

(58) Field of Classification Search
CPC .................... G06T 2207/20221; G06T 19/006
See application file for complete search history.

(56) References Cited

U.S. PATENT DOCUMENTS 10,636,206 B2 4/2020 Chen et al.
10,902,670 B1 * 1/2021 Schied .................. G06T 15/506
(Continued)

FOREIGN PATENT DOCUMENTS

KR 20180069786 A 6/2018
KR 20190028827 A 3/2019
(Continued)

OTHER PUBLICATIONS

International Search Report (PCT/ISA/210) and Written Opinion (PCT/ISA/237) dated Aug. 20, 2020, by the Korean Patent Office as the International Searching Authority for International Application No. PCT/KR2019/016643 and English language translations thereol (13 Pages).

(Continued)

*Primary Examiner* — Phong X Nguyen
(74) *Attorney, Agent, or Firm* — Buchanan Ingersoll & Rooney PC

(57) ABSTRACT

A three-dimensional (3D) modeling method of clothing considering background factors includes determining a first observation direction in which the clothing is to be observed based on a user input in a first space that is a background of a clothing display; determining a display shape of the clothing according to the first observation direction; determining a display shape of the first space according to the first observation direction; when overlapping and displaying the display shape of the clothing on the display shape of the first space, extracting a fusion part requiring a fusion of the display shape of the first space and the display shape of the clothing on the display shape of the clothing and determining a shape of the extracted fusion part; and overlapping and displaying the display shape of the clothing on the display shape of the first space, comprising the fusion part.

5 Claims, 11 Drawing Sheets

START
DETERMINE FIRST OBSERVATION DIRECTION — S1110
DETERMINE DISPLAY SHAPE OF CLOTHING — S1120
DETERMINE DISPLAY SHAPE OF BACKGROUND — S1130
DETERMINE SHAPE OF FUSION PART — S1140
OVERLAP AND DISPLAY DISPLAY SHAPE OF CLOTHING ON DISPLAY SHAPE OF SPACE, INCLUDING FUSION PART — S1150
END

(51) Int. Cl.

| | |
|---|---|
| ***G06T 5/50*** | (2006.01) |
| ***G06T 15/04*** | (2011.01) |
| ***G06T 15/50*** | (2011.01) |
| ***G06T 17/20*** | (2006.01) |

(56) References Cited

U.S. PATENT DOCUMENTS

| | | | | |
|---|---|---|---|---|
| 2003/0218610 | A1* | 11/2003 | Meeh | G06T 15/60 345/426 |
| 2008/0107344 | A1* | 5/2008 | Blake | G06T 11/001 382/199 |
| 2009/0066716 | A1* | 3/2009 | Meulen | H04N 9/75 345/589 |
| 2011/0118604 | A1* | 5/2011 | Kim | G06T 5/50 600/443 |
| 2011/0227922 | A1* | 9/2011 | Shim | G06T 15/50 345/426 |
| 2011/0234590 | A1* | 9/2011 | Jones | G06T 15/50 345/426 |
| 2012/0092328 | A1* | 4/2012 | Flaks | G06F 3/012 345/419 |
| 2015/0154691 | A1* | 6/2015 | Curry | G06F 30/23 705/27.2 |
| 2015/0205501 | A1* | 7/2015 | Fujii | G06F 3/0484 715/763 |
| 2016/0275724 | A1 | 9/2016 | Adeyoola et al. | |
| 2017/0161950 | A1* | 6/2017 | Seder | H04N 13/204 |
| 2018/0068473 | A1* | 3/2018 | Tico | G06T 3/0093 |
| 2020/0265566 | A1* | 8/2020 | Glotzbach | G06T 5/002 |
| 2022/0037624 | A1* | 2/2022 | Kim | H01L 51/5284 |

FOREIGN PATENT DOCUMENTS

| | | |
|---|---|---|
| KR | 102033161 B1 | 10/2019 |
| KR | 102044348 B1 | 11/2019 |

OTHER PUBLICATIONS

Office Action dated Sep. 18, 2020, by the Korean Patent Office, for Application No. 10-2019-0155797 and English language translation thereof (8 Pages).

* cited by examiner

THREE-DIMENSIONAL (3D) MODELING METHOD OF CLOTHING

TECHNICAL FIELD

The present disclosure relates to a three-dimensional (3D) modeling method of clothing in consideration of background factors.

BACKGROUND ART

As the standard of living gradually increases, selection of clothing is an important part as a way to express one's individuality in addition to solving basic food, clothing and shelter. People wear or own clothing that suits them or in their preferred colors and designs such that they enhance their external image as well as their self-satisfaction.

Clothing-related business that designs, manufactures, and sells clothing is expanding widely through Internet shopping malls which are active with the recent development of the Internet, in addition to the existing offline. In particular, as young people who are interested in clothing have become more prominent in their social advancement, such clothing-related business is a business field that is expected to develop continuously in the future.

Upon briefly reviewing clothing production process currently being conducted offline, first, designers create patterns by designing clothing they intend to release in the future. Then, designers sew these patterns to produce samples. When samples are produced, designers evaluate the design through an in-house meeting (exhibition), and request the production of samples of designs that are consumers' reaction, that is, expected to be highly commercial from clothing makers.

According to the related art, design work for clothing to be produced in the future, pattern production according to the design, and sewing work of connecting the produced patterns to each other are all performed manually. When design work, pattern production, and sewing work are performed manually, the manufacturing cost of the product increases because a large number of manpower must spend a lot of time working.

In addition, in the case of partially modify a high quality clothing design, because the above-described process must be repeated countless times by modifying the pattern, there is a problem that the working time for product development increases. Although methods of producing patterns on a computer by computerizing this process are partially used, to accurately evaluate the finished clothing, there is still the inconvenience of manually completing the prototype.

DESCRIPTION OF EMBODIMENTS

Technical Problem

Provided is to visually examine whether clothing being produced may match the body of various sizes in the production stage of clothing.

Provided is also to more naturally model a situation when clothing is put on the human body.

Provided is also to model clothing in various spaces.

Provided is also to model clothing by considering light conditions in various spaces.

Technical Solution to Problem

According to an aspect of the present disclosure, a three-dimensional (3D) modeling method of clothing considering background factors includes determining a first observation direction in which the clothing is to be observed based on a user input in a first space that is a background of a clothing display; determining a display shape of the clothing according to the first observation direction; determining a display shape of the first space according to the first observation direction; when overlapping and displaying the display shape of the clothing on the display shape of the first space, extracting a fusion part requiring a fusion of the display shape of the first space and the display shape of the clothing on the display shape of the clothing and determining a shape of the extracted fusion part; and overlapping and displaying the display shape of the clothing on the display shape of the first space, comprising the fusion part.

The determining of the shape of the extracted fusion part may include determining a first fusion part in which the display shape of the clothing and the display shape of the first space contact with each other on the display shape of the clothing; and determining a second fusion part in which the display shape of the first space is reflected on the display shape of the clothing on the display shape of the clothing.

The determining of the shape of the extracted fusion part may include determining a color of the fusion part by mixing a display color according to the display shape of the clothing and a display color according to the display shape of the first space in the fusion part at a predetermined ratio; and determining a shape of the fusion part by mixing a display form according to the display shape of the clothing and a display form according to the display shape of the first space in the fusion part at a predetermined ratio.

The 3D modeling method may further include, after the displaying, in response to a user input of changing an observation direction from the first observation direction to a second observation direction, determining and displaying a display shape of the clothing, a display shape of the first space, and the fusion part according to the second observation direction.

The 3D modeling method may further include, after the determining of the first observation direction, determining a light irradiation direction which is an irradiation direction of light in the first space, the determining of the display shape of the clothing may include determining the display shape of the clothing in consideration of light according to the light irradiation direction, and the determining of the display shape of the first space may include determining the display shape of the first space in consideration of the light according to the light irradiation direction.

The determining of the light irradiation direction may include making the first space correspond to a sphere-shaped space with respect to a position of the clothing and determining any one direction of a plurality of directions penetrating the sphere-shaped space as the light irradiation direction.

The determining of the display shape of the clothing may include determining the display shape of the clothing in consideration of a display shape of the clothing positioned in the center, the first observation direction and the light irradiation direction. The determining of the display shape of the first space may include determining the display shape of the first space in consideration of a display shape of the first space projected on an inner surface of the sphere-shaped space, the first observation direction and the light irradiation direction.

Advantageous Effects of Disclosure

According to the present disclosure, it is possible to visually examine whether clothing being produced may match the body of various sizes in the production stage of clothing.

In addition, the present disclosure may more naturally model a situation when clothing is put on the human body.

In addition, the present disclosure may model clothing in various spaces, and in particular, enable modeling of natural clothing.

In addition, the present disclosure may enable modeling of clothing in consideration of light conditions in various spaces.

In addition, the present disclosure may enable to easily modify clothing in each operation of clothing modeling.

BEST MODE

Figure 1:
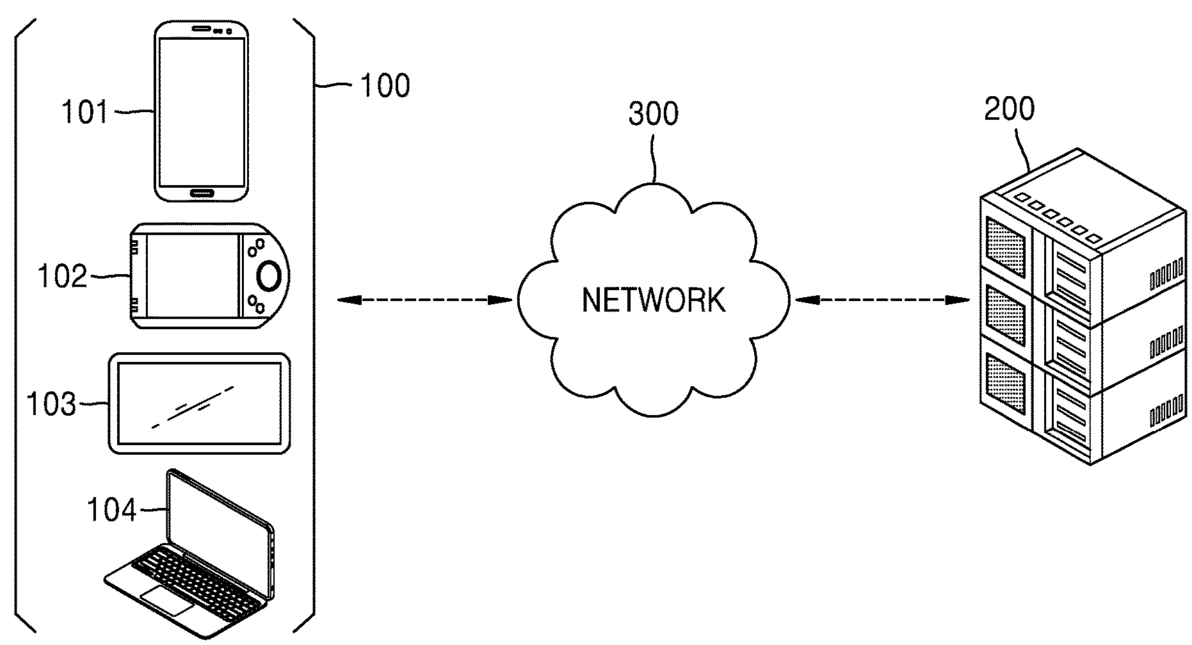
FIG. 1 is a diagram illustrating an example of a network environment according to an embodiment of the present disclosure.

According to an aspect of the present disclosure, a three-dimensional (3D) modeling method of clothing considering background factors includes determining a first observation direction in which the clothing is to be observed based on a user input in a first space that is a background of a clothing display; determining a display shape of the clothing according to the first observation direction; determining a display shape of the first space according to the first observation direction; when overlapping and displaying the display shape of the clothing on the display shape of the first space, extracting a fusion part requiring a fusion of the display shape of the first space and the display shape of the clothing on the display shape of the clothing and determining a shape of the extracted fusion part; and overlapping and displaying the display shape of the clothing on the display shape of the first space, comprising the fusion part.

MODE OF DISCLOSURE

The detailed description of the present disclosure to be described later refers to the accompanying drawings, which illustrate a specific embodiment in which the present disclosure may be practiced. These embodiments are described in detail sufficient to enable those skilled in the art to practice the present disclosure. It is to be understood that various embodiments of the present disclosure are different from each other but need not be mutually exclusive. For example, specific shapes, structures, and characteristics described herein may change from one embodiment to another and implemented without departing from the spirit and scope of the present disclosure. In addition, it should be understood that the positions or arrangements of individual elements in each embodiment may change without departing from the spirit and scope of the present disclosure. Therefore, the detailed description to be described below is not made in a limiting sense, and the scope of the present disclosure should be taken as encompassing the claimed scope of the claims and all scopes equivalent thereto. Like reference numerals in the drawings denote the same or similar elements over several aspects.

Hereinafter, various embodiments of the present disclosure will be described in detail with reference to the accompanying drawings in order to enable those skilled in the art to easily implement the present disclosure.

FIG. 1 is a diagram illustrating an example of a network environment according to an embodiment of the present disclosure.

The network environment of FIG. 1 shows the example including a plurality of user terminals 101, 102, 103 and 104, a server 200 and a network 300. FIG. 1 is an example for describing the disclosure, and the number of user terminals or the number of servers is not limited as shown in FIG. 1.

The plurality of user terminals 101, 102, 103 and 104 may be fixed terminals implemented as computer devices or mobile terminals. Examples of the plurality of user terminals 101, 102, 103, and 104 include smart phones, mobile phones, navigation, computers, notebook computers, digital broadcasting terminals, personal digital assistants (PDAs), portable multimedia players (PMPs), tablet PCs, etc.

The plurality of user terminals 101, 102, 103, and 104 may communicate with each other and/or with the server 200 over the network 300 by using a wireless or wired communication method.

Meanwhile, the communication method of the plurality of user terminals 101, 102, 103, and 104 is not limited and may also include a communication method that utilizes a communication network (for example, a mobile communication network, wired Internet, wireless Internet, and a broadcasting network) that may include the network 300 as well as short range wireless communication between devices.

For example, the network 300 may include any one or more of networks among a personal area network (PAN), a local area network (LAN), a campus area network (CAN), a metropolitan area network (MAN), a wide area network (WAN), a broadband network (BBN), and the Internet.

In addition, the network 300 may include any one or more of network topologies, including bus networks, star networks, ring networks, mesh networks, star-bus networks, tree or hierarchical networks but is not limited thereto.

Hereinafter, for convenience of description, the plurality of user terminals 101, 102, 103, and 104 are referred to as and described a user terminal 100.

The server 200 may be implemented as a computer device or a plurality of computer devices that provide commands, codes, files, contents, services, etc. to the user terminal 100 through the network 300.

For example, the server 200 may provide a file for installing an application to the user terminal 100 accessed through the network 300. The user terminal 100 may install the application using a file provided from the server 200. In this case, the application may be an application for performing a three-dimensional (3D) modeling method of clothing.

In addition, the user terminal 100 may access the server 200 under the control of an operating system (OS) and at least one program (for example, a browser or an installed application) to receive services or contents provided by the server 200. For example, when the user terminal 100 requests pattern data through the network 300, the server 200 may transmit at least one pre-generated pattern data to the user terminal 100 in response to such a request. The user terminal 100 may display and provide the pattern data to a user according to the control of the application.

Figure 2:
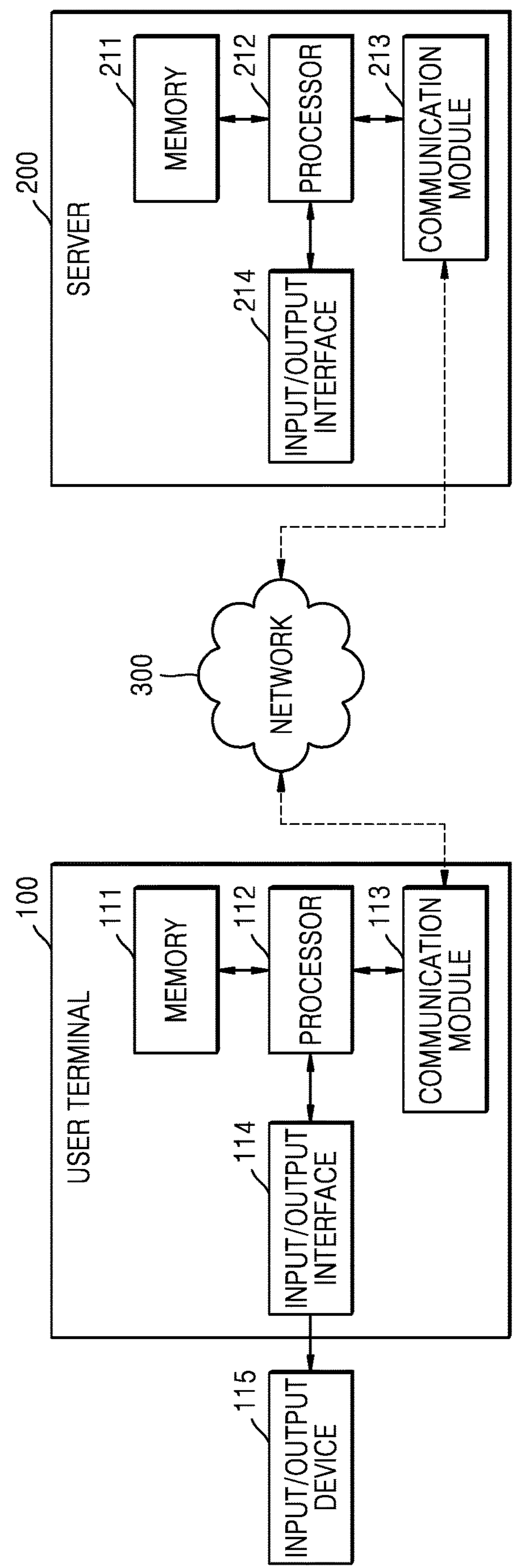
FIG. 2 is a block diagram for describing the internal configurations of a user terminal and a server according to an embodiment of the present disclosure.

FIG. 2 is a block diagram for describing the internal configurations of the user terminal 100 and the server 200 according to an embodiment of the present disclosure.

The user terminal 100 and the server 200 may respectively include memories 111 and 211, processors 112 and 212, communication modules 113 and 213, and input/output interfaces 114 and 214.

The memories 111 and 211 are computer-readable recording media, and may include permanent mass storage devices such as random access memory (RAM), read only memory (ROM), and a disk drive. In addition, the memory 111 and 211 may store an OS and at least one program code (for example, a code for 3D modeling of clothing installed and driven in the user terminal 100). These software components may be loaded from a computer-readable recording medium separate from the memories 111 and 211 using a drive mechanism. Such a separate computer-readable recording medium may include a computer-readable recording medium such as a floppy drive, a disk, a tape, a DVD/CD-ROM drive, a memory card, etc.

In another embodiment, the software components may be loaded into the memories 111 and 211 through the communication modules 113 and 213 rather than the computer-readable recording medium. For example, at least one program may be loaded into the memories 111 and 211 based on a program installed by files that are provided by developers or a file distribution system (for example, the server 200 described above) that distributes the installation file of the application through the network 300.

The processors 112 and 212 may be configured to process commands of a computer program by performing basic arithmetic, logic, and input/output operations. The commands may be provided to the processors 112 and 212 by the memories 111 and 211 or the communication modules 113 and 213. For example, the processors 112 and 212 may be configured to execute commands received according to a program code stored in a recording device such as the memories 111 and 211.

The communication modules 113 and 213 may provide functions for the user terminal 100 and the server 200 to communicate with each other through the network 300, and may provide functions to communicate with another user terminal (not shown) or another server (not shown). As an example, a request generated according to the program code that the processor 112 of the user terminal 100 stores in a recording device such as the memory 111 may be sent to the server 200 through the network 300 under the control of the communication module 113. To the contrary, control signals, commands, contents, files, etc. provided under the control of the processor 212 may be sent to the user terminal 100 via the communication module 213 and the network 300 through the communication module 113 of the user terminal 100.

The input/output interfaces 114 and 214 may be means for interfacing with an input/output device 115. In this regard, the input device may include a device such as a keyboard or mouse, and the output device may include a device such as a display for displaying 3D modeled clothing.

As another example, the input/output interfaces 114 and 214 may be means for interfacing with a device such as a touch screen in which functions for input and output are integrated into one.

In addition, in other embodiments, the user terminal 100 and the server 200 may include more components than those of FIG. 2. However, there is no need to clearly show most of components of the related art. For example, the user terminal 100 may be implemented to include at least some of the above-described input/output device 115 or may further include other components such as a transceiver, a global positioning system (GPS) module, a camera, various sensors, database, etc.

Hereinafter, an example in which a 3D modeling method of clothing is performed by the processor 112 of the user terminal 100 will be described.

The processor 112 according to an embodiment of the present disclosure may generate pattern data of clothing based on a user input.

In the present disclosure, 'pattern data' of clothing may mean a data set including various information for producing clothing. For example, the pattern data may include at least one of form, dimension information, stitch information, material information, and landmark information of at least one part constituting clothing as an attribute.

In the present disclosure, the 'part' constituting clothing may mean at least a part of clothing used for producing the corresponding clothing. For example, the part may refer to a piece of fabric cut for the production of the corresponding clothing, or may refer to a button, zipper, or other member for combining used in the production of the corresponding clothing. However, this is merely exemplary and the spirit of the present disclosure is not limited thereto.

In the present disclosure, 'stitch information' is information for combining the above-described parts, and may mean information about seams of cut pieces of fabric. In this case, the stitch information may include not only information about a material used when combining parts, but also information about a usage type when combining the corresponding material. For example, when the stitch information is information about seams of the cut pieces of fabric, the stitch information may include information about the number of sewing stitches and information about the color, thickness, and material of threads used for sewing. In addition, the stitch information may include information about physical properties of combining such as a combining method between parts, combining elasticity, and combining strength. However, this is merely exemplary and the spirit of the present disclosure is not limited thereto.

In the present disclosure, 'material information' may include visual information of a material and physical property information of the material. In this case, the visual information of the material may include a color of the material, a pattern of the material, etc. Meanwhile, the information about the physical property of the material may include thickness, density, resilience, elasticity, breathability, abrasion property, and transparency of the material. However, the above-described material information is exemplary, and may be included in the material information of the present disclosure as long as it is a property capable of representing the unique characteristics of the material.

The processor 112 according to an embodiment of the present disclosure may receive such material information from a manufacturer server (not shown) of the material, or may receive the material information from another user terminal (not shown) and store the material information in the memory 111.

The processor 112 according to an embodiment of the present disclosure may generate the aforementioned pattern data based on a user input.

In a selective embodiment, the processor 112 according to an embodiment of the present disclosure may obtain the above-described pattern data from an equipment that generates pattern data of clothing. In this case, the equipment that generates the pattern data of clothing may include, for example, a plurality of image sensors, at least one light source, and a distance sensor and generate the pattern data by scanning 3D information of clothing. However, the equipment that generates the pattern data as described above is exemplary, and the spirit of the present disclosure is not limited thereto.

Figure 3:
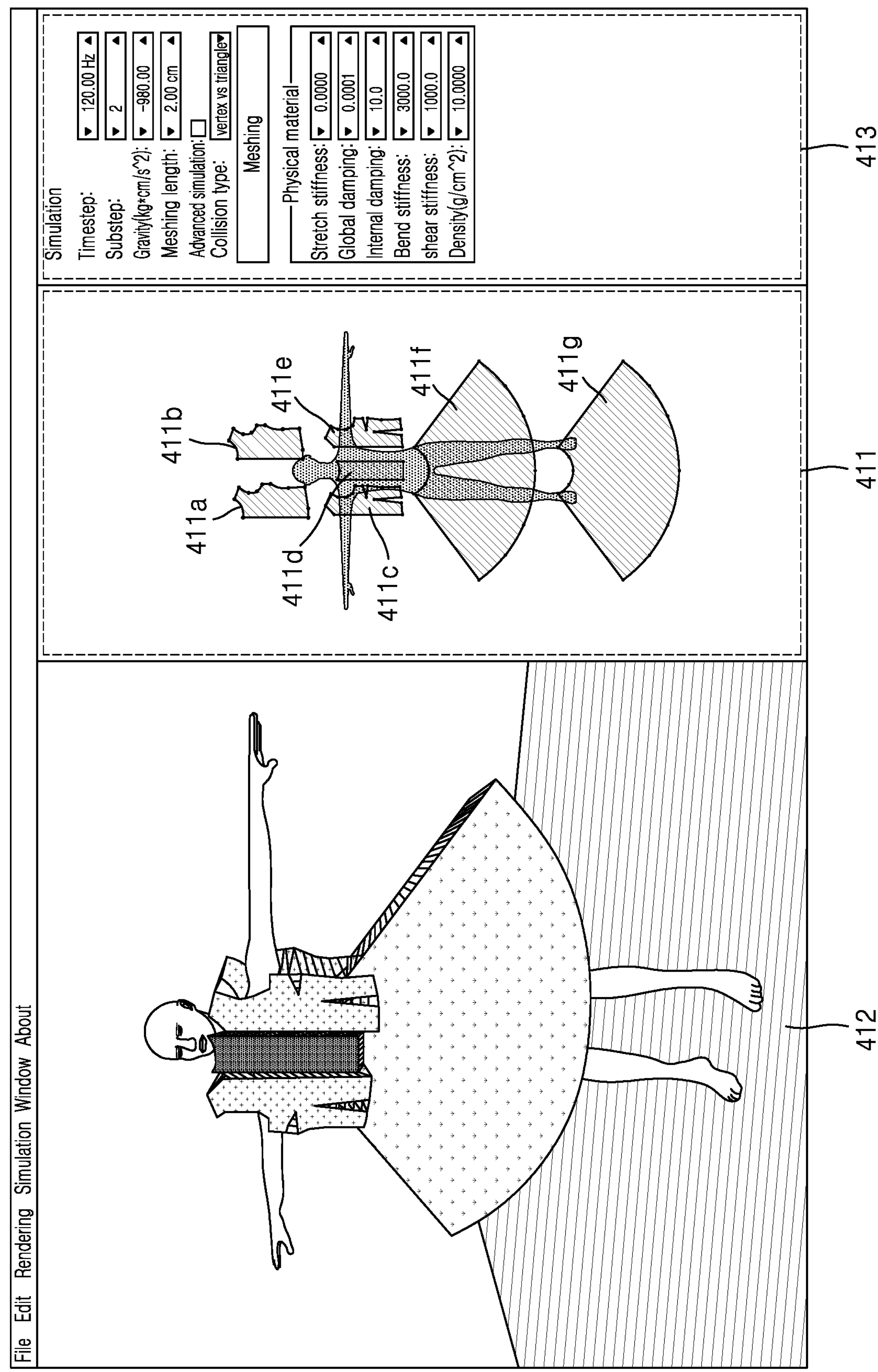
FIG. 3 is an example of a screen for generating pattern data.

FIG. 3 is an example of a screen 410 for generating pattern data.

Referring to FIG. 3, the screen 410 may include a region 411 for editing forms of parts 411*a* to 411*g* constituting clothing, a region 412 for displaying a shape of clothing in a three-dimensional (3D) space, and a region 413 for setting various setting values or setting attributes of the parts 411*a* to 411*g* or stitch information between the parts 411*a* to 411*g* when displaying clothing.

The processor 112 according to an embodiment of the present disclosure may generate the pattern data with respect to the corresponding clothing based on a user input through an interface such as the screen 410. For example, in the region 411 for editing the form of the part, a user may generate the pattern data of clothing by modifying the forms of the parts 411*a* to 411*g* or adding a new part in a two-dimensional (2D) space. Furthermore, in addition to the form of the part, the processor 112 may generate and/or edit the pattern data of clothing based on user inputs corresponding to various items constituting the pattern data of clothing.

The processor 112 may store a series of inputs and/or manipulations of the user for generating the pattern data of specific clothing in the memory 111. The processor 112 may transmit such pattern data to the server 200 and/or another user terminal (not shown) through the communication module 113.

The processor 112 according to an embodiment of the present disclosure may load the pattern data of clothing generated through the above-described process. At this time, 'loading' the pattern data may mean retrieving the pattern data from the memory 111 and/or the server 200 to make the corresponding pattern data display, editable and/or modifiable. For example, when a plurality of pattern data are generated through the above-described process, the pattern data may be loaded by a user selection of any one of a plurality of pattern data stored in the memory 111. In addition, the pattern data may be loaded by the user downloading specific pattern data from the server 200. However, this is merely exemplary and the spirit of the present disclosure is not limited thereto.

The processor 112 according to an embodiment of the present disclosure may load body data for a body on which clothing corresponding to the pattern data is to be put, similarly to loading of the pattern data. In this case, the 'body data' may include information about at least one of the size of the body, the ratio of each part, race, gender, and skin color.

Also, the processor 112 according to an embodiment of the present disclosure may modify at least one of the above-described items included in the body data based on a body data modification input of the user. For example, the processor 112 may modify information about the gender included in the body data from male to female based on a user input of modifying the gender from male to female.

The processor 112 according to an embodiment of the present disclosure may display a stereoscopic shape of the corresponding clothing based on the pattern data of clothing loaded by the above-described process. In this case, the stereoscopic shape may mean a form in the 3D space of clothing based on the pattern data.

Meanwhile, the processor 112 according to an embodiment of the present disclosure may display the stereoscopic shape of clothing in consideration of the pattern data and the separately loaded body data. In other words, the processor 112 according to an embodiment of the present disclosure may display the stereoscopic shape of clothing based on the body data and the pattern data.

Figure 4:
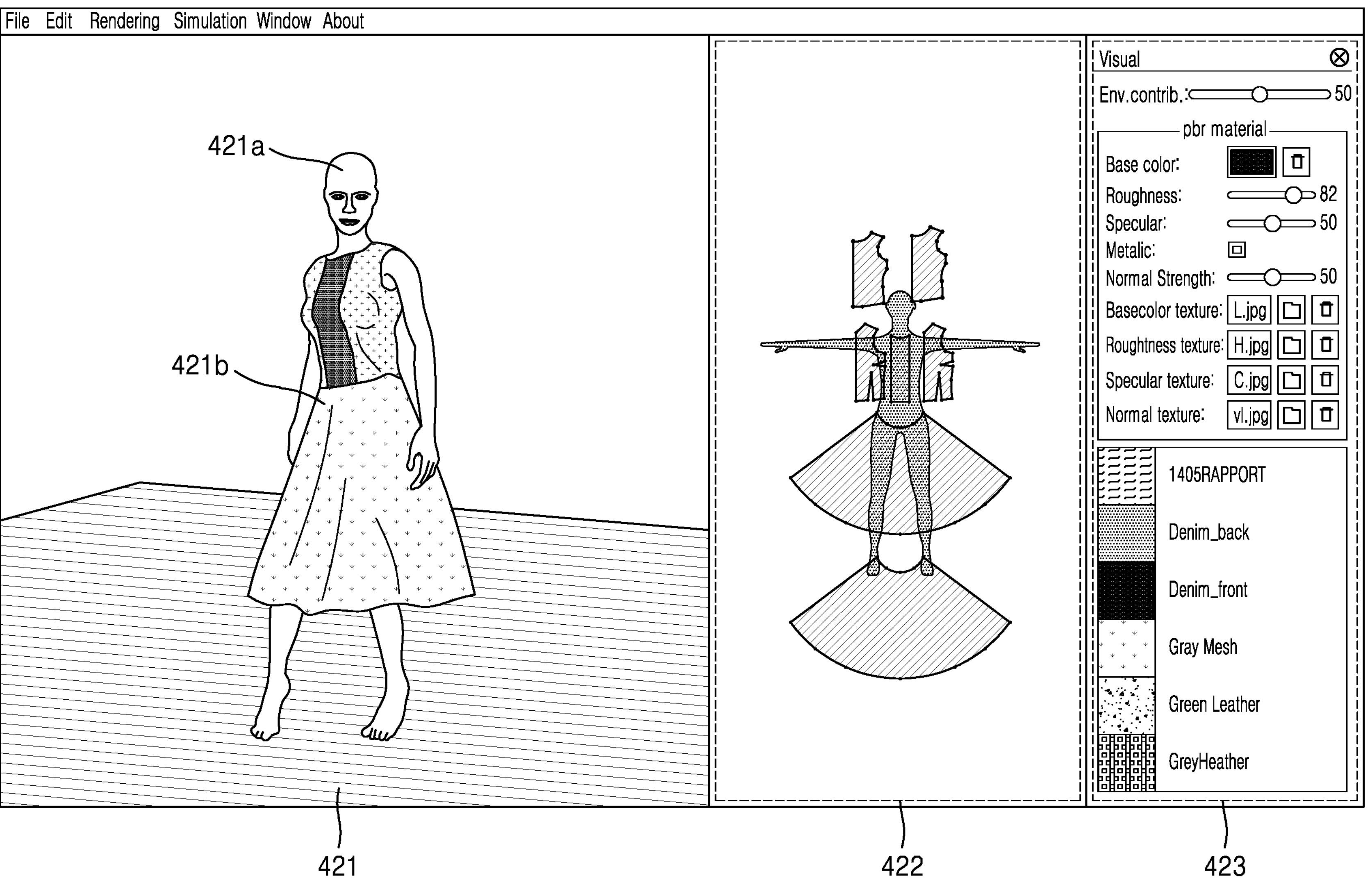
FIG. 4 is an example of a screen for displaying a stereoscopic shape of clothing.

FIG. 4 is an example of a screen 420 displaying a stereoscopic shape of clothing.

Similar to FIG. 3, the screen 420 may include a region 421 for displaying a shape in a 3D space of clothing, a region 422 for displaying or editing forms of parts constituting clothing, and a region 423 for setting various setting values when displaying clothing.

The processor 112 according to an embodiment of the present disclosure may display a 3D shape 421*a* of a body based on body data and a 3D shape 421*b* of clothing in consideration of the 3D shape 421*a* of the body on the region 421 for displaying the shape in the 3D space of clothing.

As described above, the processor 112 according to an embodiment of the present disclosure may consider the 3D shape 421*a* of the body when displaying the 3D shape 421*b* of clothing.

Meanwhile, the processor 112 according to an embodiment of the present disclosure may consider a space that is a background of a clothing display in displaying the 3D shape 421*b* of clothing.

To this end, the processor 112 according to an embodiment of the present disclosure may determine a first observation direction in which clothing is to be observed based on a user input in a first space that is the background of the clothing display. In this case, the first space is a virtual space in which the user intends to model clothing, and may be set by the user. For example, the first space may be an indoor space having a specific floor shape as shown in FIG. 4 or an outdoor space such as a beach as shown in FIG. 5.

Figure 5:
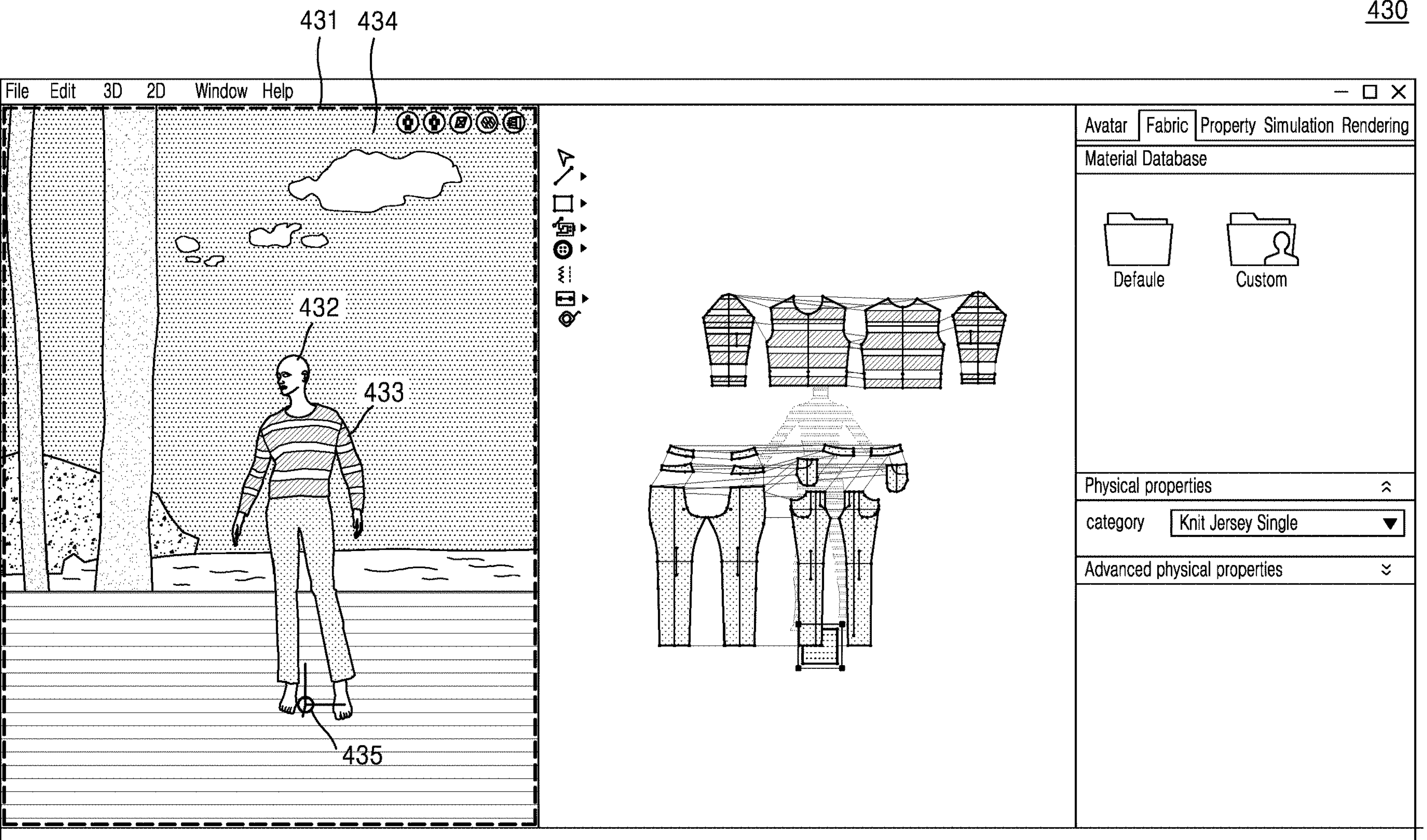
FIG. 5 is an example of a screen for determining a first observation direction based on a user input.

FIG. 5 is an example of a screen 430 for determining a first observation direction based on a user input. In this case, the screen 430 may include a 3D display region 431 displaying a 3D shape 432 of a body, a display (stereoscopic) shape 433 of clothing, and a display shape 434 of a first space.

In an embodiment of the present disclosure, the processor 112 may determine the first observation direction based on the user input with respect to the display region 431. For example, the processor 112 may change an observation direction from a third observation direction to the first observation direction or from the first observation direction to a second observation direction according to a drag input of the user with respect to any one point on the display region 431.

In a selective embodiment, the processor 112 may determine or change the observation direction based on a user input with respect to a predetermined observation direction change interface (not shown) provided on the screen 430.

In an embodiment of the present disclosure, the processor 112 may display a direction indicator 435 to inform the user of the first observation direction which is a current observation direction. For example, the user may better check a change in the observation direction by observing the direction indicator 435 while performing the drag input of the user with respect to any one point on the display region 431.

In a selective embodiment, the processor 112 according to an embodiment of the present disclosure may determine a light irradiation direction that is an irradiation direction of light in the first space.

Figure 6:
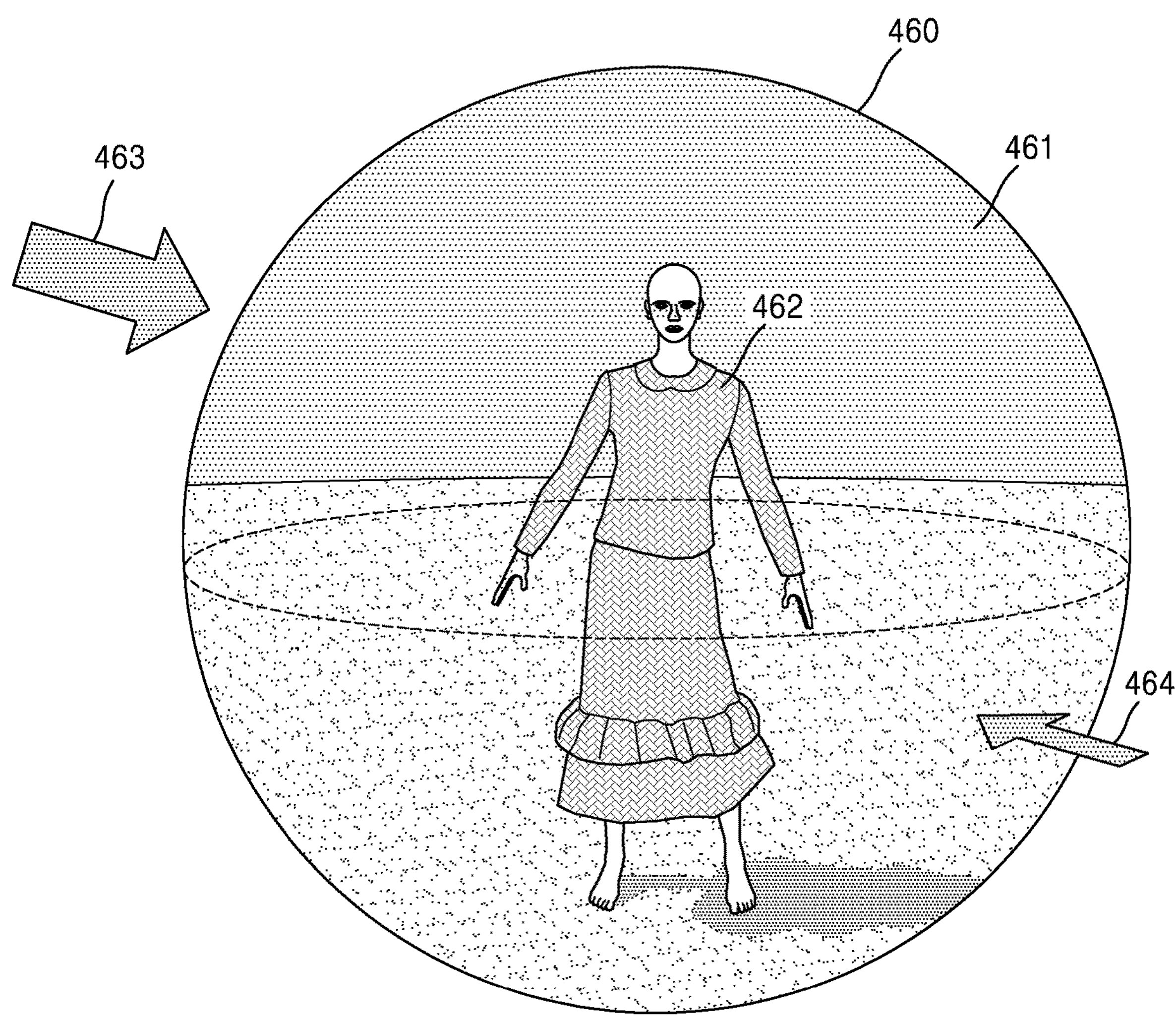
FIG. 6 is a diagram illustrating a process in which a processor determines a light irradiation direction according to an embodiment of the present disclosure.

FIG. 6 is a diagram illustrating a process in which the processor 112 determines a light irradiation direction according to an embodiment of the present disclosure.

The processor 112 according to an embodiment of the present disclosure may make a first space 461 correspond to a sphere-shaped space 460 with respect to a position of clothing 462 to be modeled. In this case, making the first space 461 correspond to the sphere-shaped space 460 may mean projecting an image representing the first space 461 onto an inner surface of the sphere-shaped space 460.

In addition, the processor 112 according to an embodiment of the present disclosure may determine any one direction 463 of a plurality of directions penetrating the sphere-shaped space 460 as the light irradiation direction in the sphere-shaped space 460 corresponding to the first space 461.

In one embodiment of the present disclosure, the light irradiation direction may be determined based on a user input specifying the direction of the sphere-shaped space 460 displayed on a screen.

The determined light irradiation direction may be used to determine a display shape of clothing and a display shape of the first space 461, and a detailed description thereof will be described later.

As described above, the present disclosure enables modeling to be performed in consideration of even light conditions in 3D modeling of clothing.

The processor 112 according to an embodiment of the present disclosure may determine the display shape of clothing according to a first observation direction. For example, when the user performs an input of changing the observation direction from an observation direction in which the side of clothing is observed to the first observation direction in which the front of clothing is observed as shown in FIG. 5, the processor 112 may determine the display shape of clothing when observing clothing in the front.

When providing (displaying) the sphere-shaped space 460 shown in FIG. 6 to the user according to a selective embodiment, the processor 112 may receive the first observation direction by obtaining a user input of a direction 464 with respect to the displayed sphere-shaped space 460. However, such an input of the direction 464 is exemplary, and the spirit of the present disclosure is not limited thereto.

In an embodiment in which the light irradiation direction is determined according to the process described with reference to FIG. 6, the processor 112 may determine the display shape of clothing in consideration of light according to the determined light irradiation direction. For example, the processor 112 may adjust the brightness of at least a part of the display shape of clothing in consideration of the light irradiation direction, or may perform processing corresponding to a shadow on the at least part. However, this is merely exemplary and the spirit of the present disclosure is not limited thereto.

The processor 112 according to an embodiment of the present disclosure may determine a display shape of the first space 461 according to the first observation direction. For example, when the user performs an input of changing the observation direction from the observation direction in which the side of clothing is observed to the first observation direction in which the front of clothing is observed as shown in FIG. 5, the processor 112 may determine the display shape of the first space 461 in consideration of the first observation direction.

In an embodiment in which the light irradiation direction is determined according to the process described with reference to FIG. 6, the processor 112 may determine the display shape of the first space 461 in consideration of light according to the determined light irradiation direction. For example, the processor 112 may adjust the brightness of at least a part of the display shape of the first space 461 in consideration of the light irradiation direction, or may perform processing corresponding to a shadow on the at least part. However, this is merely exemplary and the spirit of the present disclosure is not limited thereto.

The processor 112 according to an embodiment of the present disclosure may extract a fusion part that requires fusion of the display shape of the first space 461 and the display shape of clothing on the display shape of the clothing when overlapping and displaying the display shape of clothing on the display shape of the first space 461.

For example, the processor 112 according to an embodiment of the present disclosure may determine a first fusion part in which the display shape of clothing and the display shape of the first space 461 contact with each other on the display shape of clothing as the fusion part.

Also, the processor 112 may determine a second fusion part in which the display shape of the first space 461 is reflected on the display shape of clothing on the display shape of clothing as the fusion part. Hereinafter, the first fusion part and the second fusion part will be described with reference to FIGS. 7 to 10.

Figure 7:
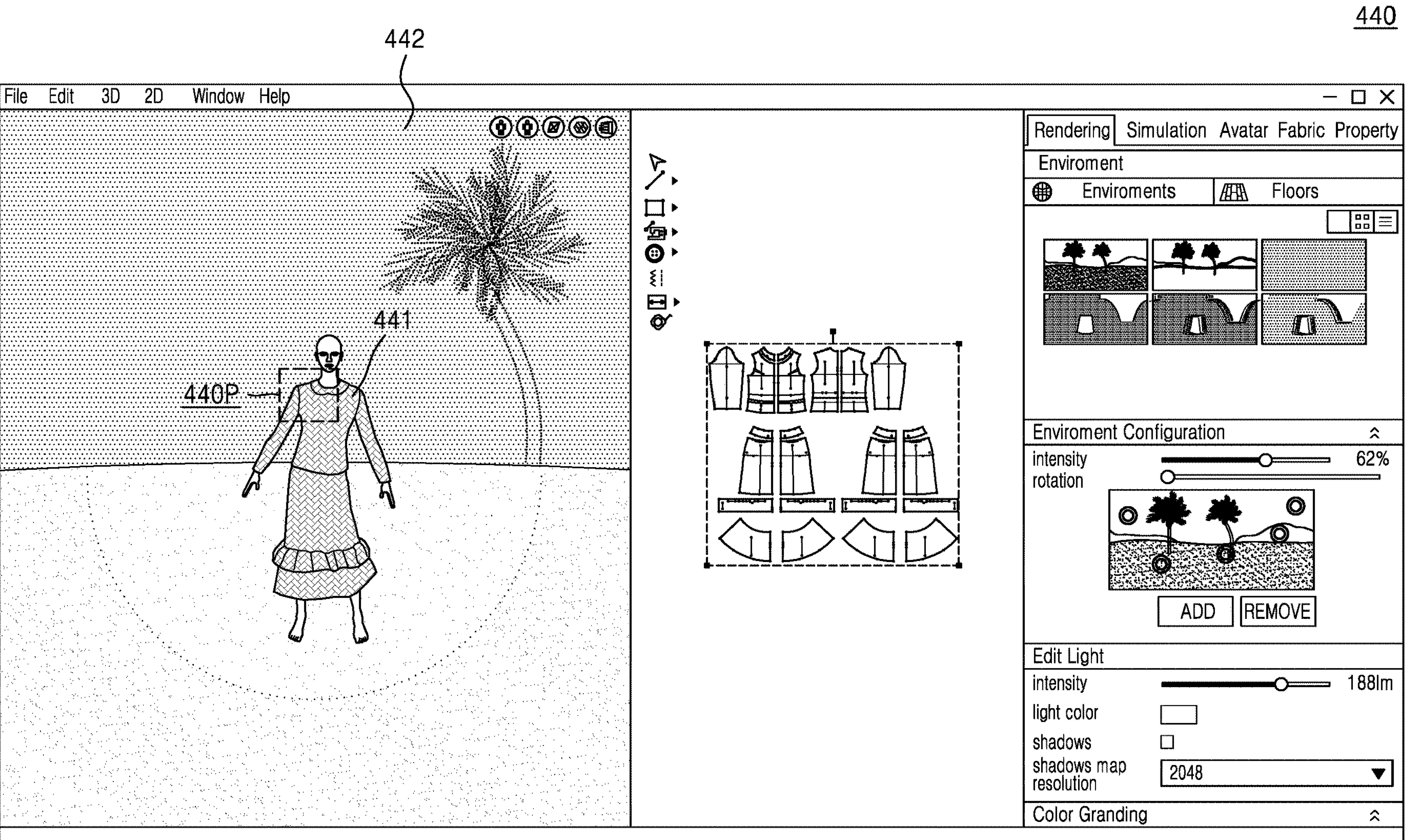
FIGS. 7 and 8 are diagrams illustrating a process in which a processor determines a first fusion part according to an embodiment of the present disclosure.
Figure 8:
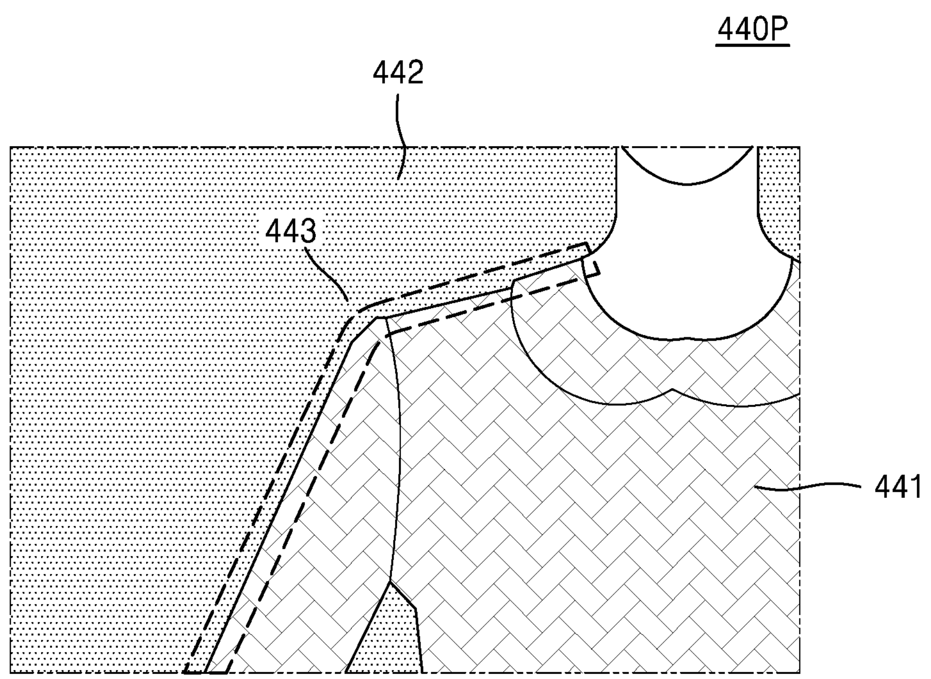

FIGS. 7 and 8 are diagrams illustrating a process in which the processor 112 determines a first fusion part 443 according to an embodiment of the present disclosure.

The processor 112 according to an embodiment of the present disclosure may determine the first fusion part 443 in which a display shape 441 of clothing and a display shape 442 of a first space contact with each other on the display shape 441 of clothing as a fusion part. In this case, the 'first fusion part' 443 in which the display shape 441 of clothing and the display shape 442 of the first space contact with each other may mean a boundary between the two shapes 441 and 442. For example, as shown on a partial screen 440P, the processor 112 may determine a part of the right shoulder part of the display shape 441 of clothing as the first fusion part 443.

Figure 9:
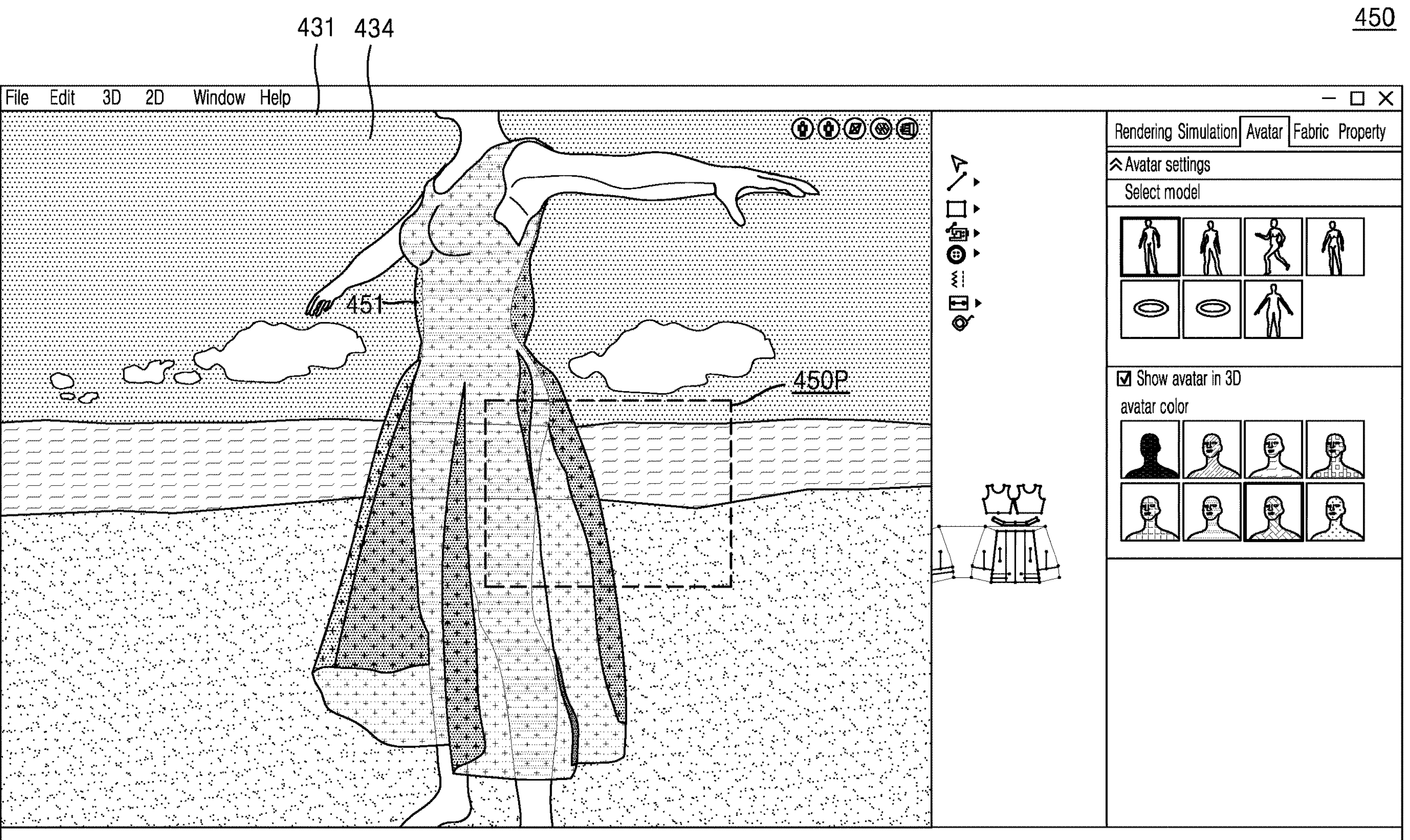
FIGS. 9 and 10 are diagrams illustrating a process in which a processor determines a second fusion part according to an embodiment of the present disclosure.
Figure 10:
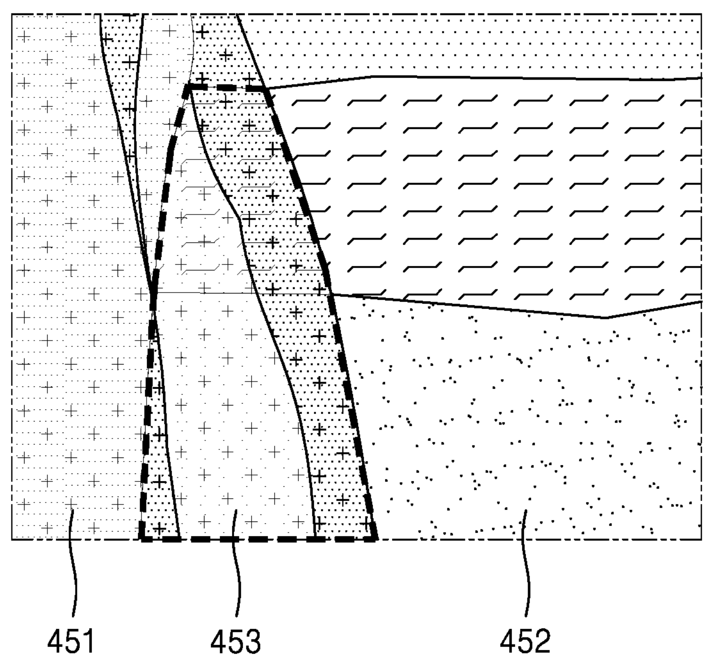

FIGS. 9 and 10 are diagrams illustrating a process in which the processor 112 determines a second fusion part 453 according to an embodiment of the present disclosure.

The processor 112 according to an embodiment of the present disclosure may determine the second fusion part 453 in which a display shape 452 of a first space is reflected on a display shape 451 of clothing on the display shape 451 of clothing as a fusion part. In this case, 'reflecting' of the display shape 452 of the first space on the display shape 451 of clothing may mean that the inner diameter is exposed through clothing due to the material characteristic of clothing. For example, the processor 112 may determine a part of a left leg part of the display shape 451 of clothing as shown on a partial screen 450P as the second fusion part 453.

The processor 112 according to an embodiment of the present disclosure may determine a shape of the fusion part determined by the above-described process.

For example, the processor 112 may determine a color of the fusion part by mixing a display color according to the display shape 451 of clothing and a display color according to the display shape 452 of the first space in the fusion part at a predetermined ratio. In this case, the predetermined ratio may be determined by referring to the light irradiation direction and pattern data of clothing.

In addition, the processor 112 may determine a form of the fusion part by mixing a display form according to the display shape 451 of clothing and a display form according to the display shape 452 of the first space in the fusion part at a predetermined ratio.

For example, in FIGS. 7 and 8, the processor 112 may mix a display color according to the display shape 441 of clothing and a display color according to the display shape 442 of the first space at a predetermined ratio when determining a color of the first fusion part 443.

For example, in FIGS. 9 and 10, the processor 112 may mix a display color according to the display shape 451 of clothing and a display color according to the display shape 452 of the first space at a predetermined ratio when determining a color of the second fusion part 453. In addition, when determining a display form of the second fusion part 453, the processor 112 may mix the display form (that is, a race form) according to the display shape 451 of clothing and the display form (forms of the land and the sea) of the display shape 452 of the first space.

In a selective embodiment, the processor 112 may determine the shape of the fusion part in units of a predetermined unit size. For example, the processor 112 may determine the shape of the fusion part in units of pixel blocks including a predetermined number of pixels or in units of pixels.

The processor 112 according to an embodiment of the present disclosure may overlap and display the display shape 451 of clothing on the display shape 452 of the first space, including the fusion part determined by the above-described process. In this case, a part corresponding to the fusion part on the display shape 451 of clothing may be displayed as the shape of the fusion part determined by the above-described process.

In response to a user input of changing from the first observation direction to the second observation direction, the processor 112 according to an embodiment of the present disclosure may determine and display a display shape of clothing, a display shape of the first space, and a fusion part according to the second observation direction according to the above-described process.

In other words, the processor 112 may update and display the display shape of clothing, the display shape of the first space, and the shape of the fusion part according to the observation change.

According to a selective embodiment, when the light irradiation direction is determined by the processor 112, the processor 112 may display the updated shapes (the display shape of clothing, the display shape of the first space, and the shape of the fusion part) even in consideration of the light irradiation direction, in addition to the change in the observation direction.

In this case, the processor 112 may determine the display shape of clothing in consideration of the display shape of clothing positioned at the center of the sphere-shaped space 460 in FIG. 6, the second observation direction, and the light irradiation direction.

In addition, the processor 112 may determine the display shape of the first space in consideration of a display shape of the first space projected on an inner surface of the sphere-shaped space 460, the second observation direction, and the light irradiation direction. The processor 112 may display the determined display shape of clothing and display shape of the first space together.

Accordingly, the present disclosure may model clothing in various spaces, and in particular, enable natural modeling of clothing. In addition, the present disclosure enables modeling of clothing in consideration of light conditions in various spaces.

Figure 11:
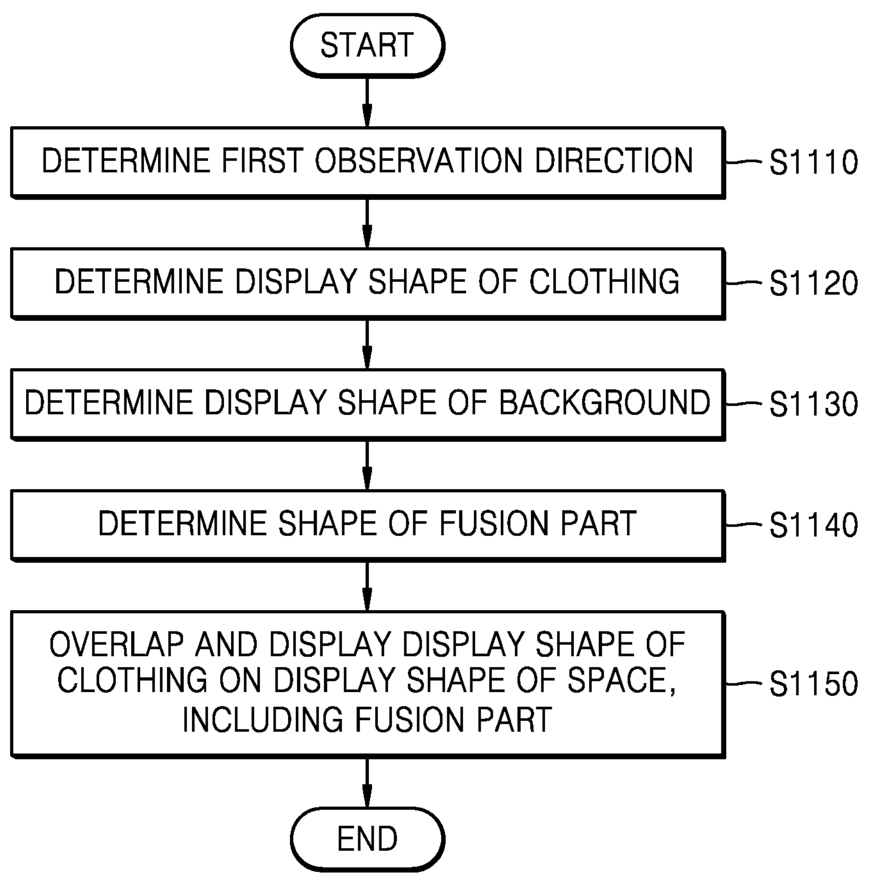
FIG. 11 is a flowchart illustrating a 3D modeling method of clothing performed by a user terminal according to an embodiment of the present disclosure.

FIG. 11 is a flowchart illustrating a 3D modeling method of clothing performed by the user terminal 100 according to an embodiment of the present disclosure. Hereinafter, descriptions of FIG. 11 redundant with those in FIGS. 1 to 10 will be omitted, and FIG. 11 will be described with reference to FIGS. 1 to 10 together.

The user terminal 100 according to an embodiment of the present disclosure may determine a first observation direction in which clothing is to be observed based on a user input in a first space that is a background of a clothing display. (S1110) In this case, the first space is a virtual space in which a user wants to model clothing, and may be set by the user. For example, the first space may be an indoor space having a specific floor shape as shown in FIG. 4 or an outdoor space such as a beach as shown in FIG. 5.

FIG. 5 is an example of the screen 430 for determining a first observation direction based on a user input. In this case, the screen 430 may include the 3D display region 431 displaying the 3D shape 432 of the body, the display (stereoscopic) shape 433 of clothing, and the display shape 434 of a first space.

In an embodiment of the present disclosure, the user terminal 100 may determine the first observation direction based on the user input with respect to the display region 431. For example, the user terminal 100 may change an observation direction from a third observation direction to the first observation direction or from the first observation direction to a second observation direction according to a drag input of the user with respect to any one point on the display region 431.

In a selective embodiment, the user terminal 100 may determine or change the observation direction based on a user input with respect to a predetermined observation direction change interface (not shown) provided on the screen 430.

In an embodiment of the present disclosure, the user terminal 100 may display the direction indicator 435 to inform the user of the first observation direction which is a current observation direction. For example, the user may better check a change in the observation direction by observing the direction indicator 435 while performing the drag input of the user with respect to any one point on the display region 431.

In a selective embodiment, the user terminal 100 according to an embodiment of the present disclosure may determine a light irradiation direction that is an irradiation direction of light in the first space.

FIG. 6 is a diagram illustrating a process in which the user terminal 100 determines a light irradiation direction according to an embodiment of the present disclosure.

The user terminal 100 according to an embodiment of the present disclosure may make the first space 461 correspond to the sphere-shaped space 460 with respect to the position of clothing 462 to be modeled. In this case, making the first space 461 correspond to the sphere-shaped space 460 may mean projecting an image representing the first space 461 onto an inner surface of the sphere-shaped space 460.

In addition, the user terminal 100 according to an embodiment of the present disclosure may determine any one direction 463 of a plurality of directions penetrating the sphere-shaped space 460 as the light irradiation direction in the sphere-shaped space 460 corresponding to the first space 461.

In one embodiment of the present disclosure, the light irradiation direction may be determined based on a user input specifying the direction of the sphere-shaped space 460 displayed on a screen.

The determined light irradiation direction may be used to determine a display shape of clothing and a display shape of the first space 461, and a detailed description thereof will be described later.

As described above, the present disclosure enables modeling to be performed in consideration of even light conditions in 3D modeling of clothing.

The user terminal 100 according to an embodiment of the present disclosure may determine the display shape of clothing according to a first observation direction. (S1120) For example, when the user performs an input of changing the observation direction from an observation direction in which the side of clothing is observed to the first observation direction in which the front of clothing is observed as shown in FIG. 5, the user terminal 100 may determine the display shape of clothing when observing clothing in the front.

When providing (displaying) the sphere-shaped space 460 shown in FIG. 6 to the user according to a selective embodiment, the user terminal 100 may receive the first observation direction by obtaining a user input of a direction 464 with respect to the displayed sphere-shaped space 460. However, such an input of the direction 464 is exemplary, and the spirit of the present disclosure is not limited thereto.

In an embodiment in which the light irradiation direction is determined according to the process described with reference to FIG. 6, the user terminal 100 may determine the display shape of clothing in consideration of light according to the determined light irradiation direction. For example, the user terminal 100 may adjust the brightness of at least a part of the display shape of clothing in consideration of the light irradiation direction, or may perform processing corresponding to a shadow on the at least part. However, this is merely exemplary and the spirit of the present disclosure is not limited thereto.

The user terminal 100 according to an embodiment of the present disclosure may determine a display shape of the first space 461 according to the first observation direction. (S1130) For example, when the user performs an input of changing the observation direction from the observation direction in which the side of clothing is observed to the first observation direction in which the front of clothing is observed as shown in FIG. 5, the user terminal 100 may determine the display shape of the first space 461 in consideration of the first observation direction.

In an embodiment in which the light irradiation direction is determined according to the process described with reference to FIG. 6, the user terminal 100 may determine the display shape of the first space 461 in consideration of light according to the determined light irradiation direction. For example, the user terminal 100 may adjust the brightness of at least a part of the display shape of the first space 461 in consideration of the light irradiation direction, or may perform processing corresponding to a shadow on the at least part. However, this is merely exemplary and the spirit of the present disclosure is not limited thereto.

The user terminal 100 according to an embodiment of the present disclosure may extract a fusion part that requires fusion of the display shape of the first space 461 and the display shape of clothing on the display shape of the clothing when overlapping and displaying the display shape of clothing on the display shape of the first space 461. (S1140)

For example, the user terminal 100 according to an embodiment of the present disclosure may determine a first fusion part in which the display shape of clothing and the display shape of the first space 461 contact with each other on the display shape of clothing as the fusion part.

Also, the user terminal 100 may determine a second fusion part in which the display shape of the first space 461 is reflected on the display shape of clothing on the display shape of clothing as the fusion part. Hereinafter, the first fusion part and the second fusion part will be described with reference to FIGS. 7 to 10.

FIGS. 7 and 8 are diagrams for describing a process in which the user terminal 100 determines a first fusion part 443 according to an embodiment of the present disclosure.

The user terminal 100 according to an embodiment of the present disclosure may determine the first fusion part 443 in which the display shape 441 of clothing and a display shape 442 of the first space contact with each other on the display shape 441 of clothing as a fusion part. In this case, the 'first fusion part' 443 in which the display shape 441 of clothing and the display shape 442 of the first space contact with each other may mean a boundary between the two shapes 441 and 442. For example, as shown on the partial screen 440P, the user terminal 100 may determine a part of the right shoulder part of the display shape 441 of clothing as the first fusion part 443.

FIGS. 9 and 10 are diagrams for describing a process in which the user terminal 100 determines the second fusion part 453 according to an embodiment of the present disclosure.

The user terminal 100 according to an embodiment of the present disclosure may determine the second fusion part 453 in which the display shape 452 of the first space is reflected on the display shape 451 of clothing on the display shape 451 of clothing as a fusion part. In this case, 'reflecting' of the display shape 452 of the first space on the display shape 451 of clothing may mean that the inner diameter is exposed through clothing due to the material characteristic of clothing. For example, the user terminal 100 may determine a part of a left leg part of the display shape 451 of clothing as shown on the partial screen 450P as the second fusion part 453.

The processor 112 according to an embodiment of the present disclosure may determine a shape of the fusion part determined by the above-described process.

For example, the user terminal 100 may determine a color of the fusion part by mixing a display color according to the display shape 451 of clothing and a display color according to the display shape 452 of the first space in the fusion part at a predetermined ratio. In this case, the predetermined ratio may be determined by referring to the light irradiation direction and pattern data of clothing.

In addition, the user terminal 100 may determine a form of the fusion part by mixing a display form according to the display shape 451 of clothing and a display form according to the display shape 452 of the first space in the fusion part at a predetermined ratio.

For example, in FIGS. 7 and 8, the user terminal 100 may mix a display color according to the display shape 441 of clothing and a display color according to the display shape 442 of the first space at a predetermined ratio when determining a color of the first fusion part 443.

For example, in FIGS. 9 and 10, the user terminal 100 may mix a display color according to the display shape 451 of clothing and a display color according to the display shape 452 of the first space at a predetermined ratio when determining a color of the second fusion part 453. In addition, when determining a display form of the second fusion part 453, the user terminal 100 may mix the display form (that is, a race form) according to the display shape 451 of clothing and the display form (forms of the land and the sea) of the display shape 452 of the first space.

In a selective embodiment, the user terminal 100 may determine the shape of the fusion part in units of a predetermined unit size. For example, the user terminal 100 may determine the shape of the fusion part in units of pixel blocks including a predetermined number of pixels or in units of pixels.

The user terminal 100 according to an embodiment of the present disclosure may overlap and display the display shape 451 of clothing on the display shape 452 of the first space, including the fusion part determined by the above-described process. (S1150) In this case, a part corresponding to the fusion part on the display shape 451 of clothing may be displayed as the shape of the fusion part determined by the above-described process.

In response to a user input of changing from the first observation direction to the second observation direction, the user terminal 100 according to an embodiment of the present disclosure may determine and display a display shape of clothing, a display shape of the first space, and a fusion part according to the second observation direction according to the above-described process.

In other words, the user terminal 100 may update and display the display shape of clothing, the display shape of the first space, and the shape of the fusion part according to the observation change.

According to a selective embodiment, when the light irradiation direction is determined by the user terminal 100, the user terminal 100 may display the updated shapes (the display shape of clothing, the display shape of the first space, and the shape of the fusion part) even in consideration of the light irradiation direction, in addition to the change in the observation direction.

In this case, the user terminal 100 may determine the display shape of clothing in consideration of the display shape of clothing positioned at the center of the sphere-shaped space 460 in FIG. 6, the second observation direction, and the light irradiation direction.

In addition, the user terminal 100 may determine the display shape of the first space in consideration of a display shape of the first space projected on an inner surface of the sphere-shaped space 460, the second observation direction, and the light irradiation direction. The user terminal 100 may display the determined display shape of clothing and display shape of the first space together.

Accordingly, the present disclosure may model clothing in various spaces, and in particular, enable natural modeling of clothing. In addition, the present disclosure enables modeling of clothing in consideration of light conditions in various spaces.

The device described above may be realized as hardware elements, software elements, and/or the combination of hardware elements and software elements. For example, the device and the components described in the embodiments may be realized by using, for example, a processor, an arithmetic logic unit (ALU), a digital signal processor, a microcomputer, a field programmable gate array (FPGA), a programmable logic unit (PLU), a microprocessor, or one or more general-purpose computers or special-purpose computers, such as a device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations embodied by a computer. The non-transitory computer-readable media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, although the embodiments have been described by the limited embodiment and drawings, it will be apparent to one of ordinary skill in the art that various changes in form and details may be made in these examples without departing from the spirit and scope of the claims and their equivalents. For example, suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A three-dimensional (3D) modeling method of clothing considering background factors, the 3D modeling method comprising:

determining a first observation direction in which the clothing is to be observed based on a user input in a first space that is a background of a clothing display;

determining a display shape of the clothing according to the first observation direction;

determining a display shape of the first space according to the first observation direction;

extracting a fusion part of an overlapping display shape of the clothing on the display shape of the first space, said fusion part requiring a fusion of the display shape of the first space and the display shape of the clothing on the display shape of the clothing and determining a shape of the extracted fusion part;

determining a color of the fusion part on a basis of a light irradiation direction of light and pattern data of the clothing; and overlapping and displaying the display shape of the clothing on the display shape of the first space, comprising the fusion part.

2. The 3D modeling method of claim 1, wherein the determining of the shape of the extracted fusion part comprises:

determining a first fusion part in which the display shape of the clothing and the display shape of the first space contact with each other on the display shape of the clothing; and determining a second fusion part in which the display shape of the first space is reflected on the display shape of the clothing on the display shape of the clothing.

3. The 3D modeling method of claim 1, wherein determining the color of the fusion part includes mixing a display color according to the display shape of the clothing and a display color according to the display shape of the first space in the fusion part at a predetermined ratio, wherein the predetermined ratio is based on at least the light irradiation direction; and determining a shape of the fusion part by mixing a display form according to the display shape of the clothing and a display form according to the display shape of the first space in the fusion part at a predetermined ratio.

4. The 3D modeling method of claim 1, further comprising:

after the displaying, in response to a user input of changing an observation direction from the first observation direction to a second observation direction, determining and displaying a display shape of the clothing, a display shape of the first space, and the fusion part according to the second observation direction.

5. The 3D modeling method of claim 1, further comprising:

after the determining of the first observation direction, determining the light irradiation direction which is an irradiation direction of light in the first space, wherein the determining of the display shape of the clothing includes determining the display shape of the clothing in consideration of light according to the light irradiation direction, and wherein the determining of the display shape of the first space includes determining the display shape of the first space in consideration of the light according to the light irradiation direction.

* * * * *